United States Patent [19]

Pescetto

[11] 4,131,234
[45] Dec. 26, 1978

[54] ADJUSTABLE BUBBLER SPRINKLER HEAD

[75] Inventor: James R. Pescetto, Springfield, Ill.

[73] Assignee: L. R. Nelson Corporation, Peoria, Ill.

[21] Appl. No.: 824,113

[22] Filed: Aug. 12, 1977

[51] Int. Cl.$^2$ ............................................. B05B 1/14
[52] U.S. Cl. ................................... 239/457; 239/460; 239/562; 239/DIG. 1
[58] Field of Search ................ 239/DIG. 1, 107, 457, 239/460, 542, 562, 583

[56] References Cited

U.S. PATENT DOCUMENTS

| | | | |
|---|---|---|---|
| 2,130,810 | 9/1938 | Munz | 239/457 X |
| 2,533,969 | 12/1950 | Socall | 239/460 |
| 2,650,132 | 8/1953 | Reinecke | 239/562 X |
| 3,794,249 | 2/1974 | Lockwood | 239/DIG. 1 |

*Primary Examiner*—Robert W. Saifer
*Attorney, Agent, or Firm*—Cushman, Darby & Cushman

[57] ABSTRACT

A sprinkler head comprising an annular sprinkler body of molded plastic having a tubular member of molded plastic snapped into operative fixed relation within the central portion thereof. A flow adjusting screw is threaded within the tubular member and has its head in adjustable flow restricting relation to inlet passages in the sprinkler body. Water flowing through the controlled inlet passages moves upwardly along the interior of an annular wall in the annular body, outwardly along an end wall of a molded plastic spray adjusting member threadedly mounted on the upper end of the tubular member, downwardly between the exterior of the annular wall and the interior of a peripheral wall of the adjusting member and then radially outwardly between cooperating flow pattern defining surfaces on the spray adjusting member and sprinkler body. The axial position of the spray adjusting member determines the spray pattern which is variable from a thick umbrella sheet pattern to a plurality of annularly spaced radially extending discrete streams.

14 Claims, 6 Drawing Figures

ADJUSTABLE BUBBLER SPRINKLER HEAD

This invention relates to sprinkler heads and more particularly to spray heads of the adjustable bubbler nozzle type.

Spray heads of the adjustable bubbler nozzle type are useful in drip and trickle irrigation as well as having special applications in watering shrubs and other plantings where a spray type of bubbler pattern is required. Examples of sprinkler heads of this type are as follows: U.S. Pat. Nos. 2,075,589; 2,125,978; 2,434,767; 2,631,889; 2,763,512; 3,454,225; 3,650,478; 3,746,263; 3,762,649 and 3,753,527.

While a great number of different sprinkler head configurations have been proposed, there is still a need for a sprinkler head of the adjustable bubbler nozzle type which provides for adjustment both in flow rate and spray pattern and which can be economically manufactured and assembled.

It is an object of the present invention to provide a sprinkler head of the adjustable bubbler nozzle type which provides for both flow adjustment and spray pattern adjustment. Preferably the adjustment provided for the spray pattern is operable to change the pattern from an umbrella sheet pattern to a multiplicity of annularly spaced radially extending streams.

In accordance with the principles of the present invention, this object is obtained by providing a sprinkler head which includes an annular body having exterior threads on the lower portion thereof for fixedly securing the sprinkler body on the end of a supply pipe or the like having a source of water under pressure communicated therewith. The body includes a central tubular member which defines an interiorly threaded opening extending axially in relation to the annular body. An adjusting screw is threadedly mounted within the interior threaded opening and has an enlarged head on the lower end thereof disposed in communication relative to the water under pressure communicated with the body. The body provides inlet passage means in flow restricted relation with respect to the adjusting screw head whereby the axial position of the adjusting screw head determines the amount of flow of water through the inlet passage means. The body also includes an annular wall disposed outwardly of the inlet passage means and extending upwardly therefrom for directing the flow of water passing through the inlet passage means upwardly along the interior thereof. A spray adjusting member is mounted on the upper end portion of the tubular member for axial adjustment with respect thereto. The spray adjusting member has an upper end wall disposed in a position above the annular wall of the body so as to cause the flow of water directed outwardly by the upper end wall to pass downwardly between the interior of the peripheral wall and the exterior of the annular wall. The lower portion of the peripheral wall and the adjusting annular portion of the sprinkler head body have cooperating respectively downwardly facing and upwardly facing surfaces which serve to confine the water flowing downwardly between the peripheral wall and the annular wall into an outwardly directed spray pattern which can be varied depending upon the axial position of adjustment of the spray adjusting member with respect to the body.

Preferably, the upwardly facing annular surface on the body is a planar annular surface while the downwardly facing surface on the peripheral wall consists of a mating planar surface having a plurality of annularly spaced radially extending semi-cylindrical recesses formed therein so that when the planar surfaces are moved into engagement in one limiting position of adjustment of the spray adjusting member, the semicylindrical recesses define the spray pattern as discrete streams.

Also preferably, the sprinkler head body and tubular member are molded of separate plastic pieces. The tubular member having lower exterior surfaces cooperating with interior surfaces in the body for enabling the tubular member to be moved axially with respect to the body and snapped into a fixed operative position wherein the exterior and interior surfaces are in engagement and effectively prevent relative movement between the tubular member and the body.

The spray adjusting member is also preferably molded of plastic materials so that the entire sprinkler head is formed of four components which include three plastic molded parts and a conventional headed metal screw with the end thereof remote from its head slotted. These components are assembled by threadedly engaging the spray adjusting member on the tubular member and then snap-fitting the tubular member within the body. Assembly is completed by turning the screw upwardly into the threaded opening of the tubular member to bring the lower head thereof into flow restricting relation to the inlet passage of the sprinkler head.

The arrangement is such as to provide for flow rate adjustment with the sprinkler head in its operative position by simply moving a turning tool, such as a screwdriver, downwardly through the open upper end of the tubular member and into the slot formed in the end of the adjusted screw. The threaded connection of the spray adjusting member on the tubular member enables the spray adjusting member to be moved axially by simply turning the same. Preferably, cooperating axially extending stop ribs are provided between the spray adjusting member and the sprinkler body for limiting the extent of turning movement of the spray adjusting member to an angular extent of less than 360° so as to prevent the spray adjusting member from being fully removed from the tubular member by turning movement.

The axial movement of the spray adjusting member with respect to the sprinkler body determines the thickness and diameter of the umbrella sheet spray pattern of the sprinkler head through the entire adjustment from its opened limiting position to its opposite limiting position wherein the planar surfaces are in engagement and the semi-cylindrical recesses define the spray pattern as discrete streams. This arrangement is particularly desirable for drip and trickle irrigation in that the semi-cylindrical recesses may be of very small dimensions of a size range which would normally present clogging problems; however, since the planar surfaces which serve to close the semi-cylindrical recesses are capable of relative axial movement apart as by the turning movement of the spray adjusting member, the stream defining openings can be readily unclogged or cleared in this fashion in the event that clogging should occur.

These and other objects will become more apparent during the course of the following detailed description and in the appended claims.

The invention may best be understood with reference to the accompanying drawings wherein an illustrative embodiment is shown. In the drawings.

Figure 1:
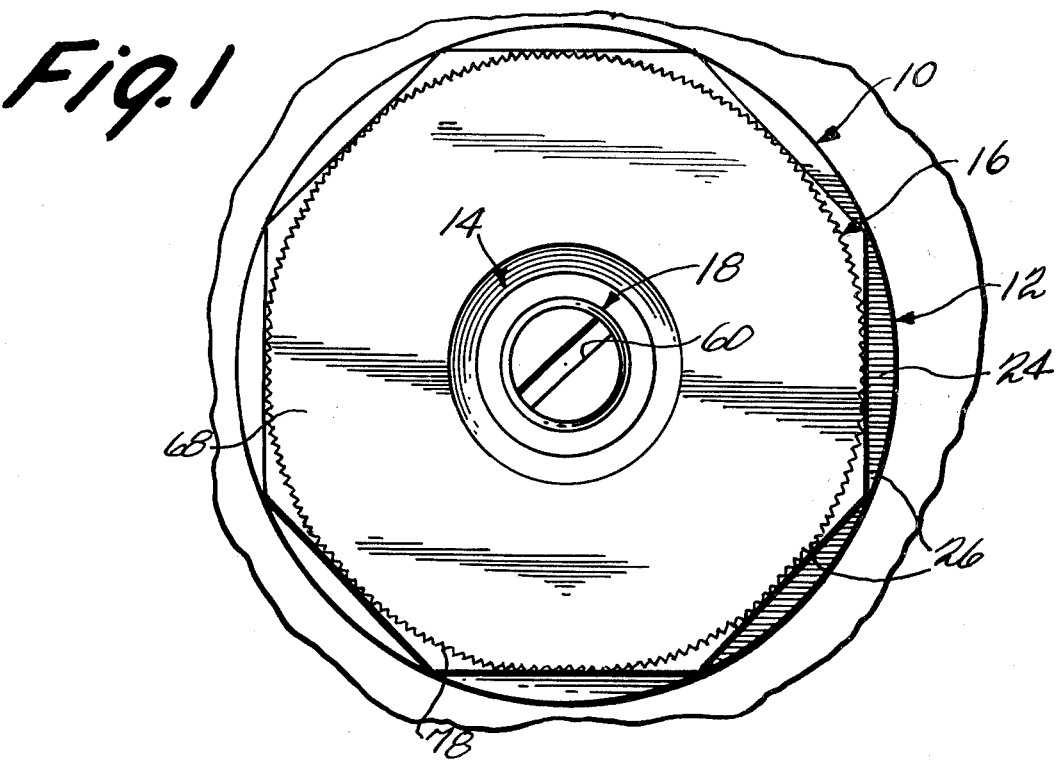
FIG. 1 is a top plan view of a sprinkler head embodying the principles of the present invention.

Referring now more particularly to the drawings, there is shown therein a sprinkler head, generally indicated at 10, which embodies the principles of the present invention. In its preferred form, the sprinkler head consists of four components, three of which are molded of a suitable plastic material as, for example, polyoxymethylene (Delrin) or an oxymethylene carbon monoxide copolymer (Celcon). Molded components include a sprinkler body generally indicated at 12, a tubular member generally indicated at 14 and a spray adjusting member generally indicated at 16. The fourth component consists of a metal screw generally indicated at 18.

The sprinkler body 12 is generally of hollow annular configuration and has a section of threads 20 formed on the lower portion thereof in its exterior periphery. The threads 20 are adapted to cooperate with interior threads of a supply pipe generally indicated at 22 which has in communication therewith a source of water under pressure. Extending outwardly from the central portion of the annular body 12 is a radially extending annular flange 24, the lower surface of which is adapted to engage the upper surface of sprinkler pipe 22 when the body 12 is fixedly engaged therein. Formed on the exterior periphery of the annular body 12 above the flange 24 is a plurality of wrench engaging lands 26. As shown, the lands 26 are arranged in regular octagonal configuration.

Figure 3:
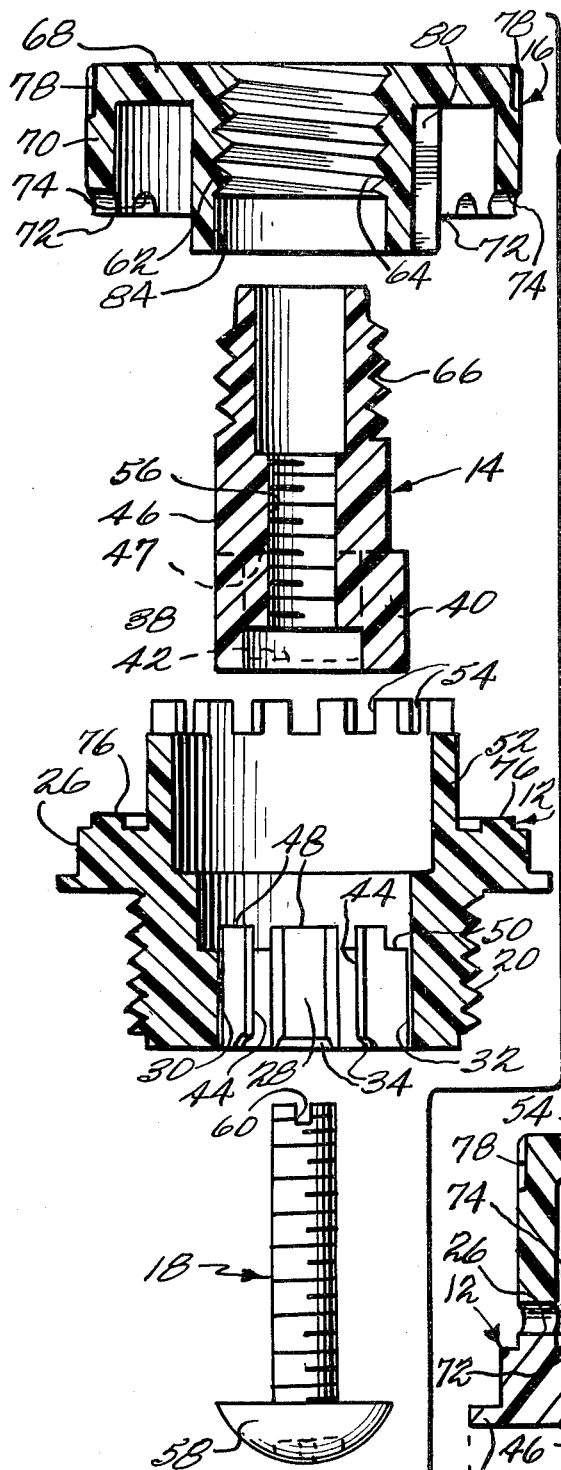
FIG. 3 is an exploded vertical sectional view of the component parts of the sprinkler head shown in FIG. 1.
Figure 6:
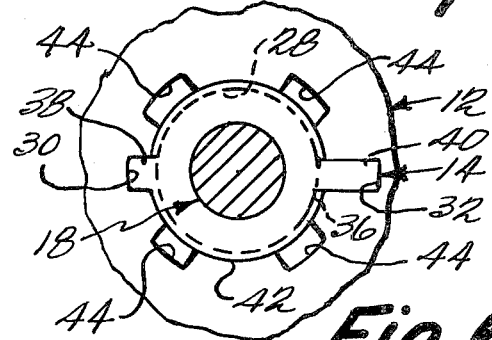
FIG. 6 is a fragmentary sectional view taken along line 6—6 of FIG. 4.
Figure 4:
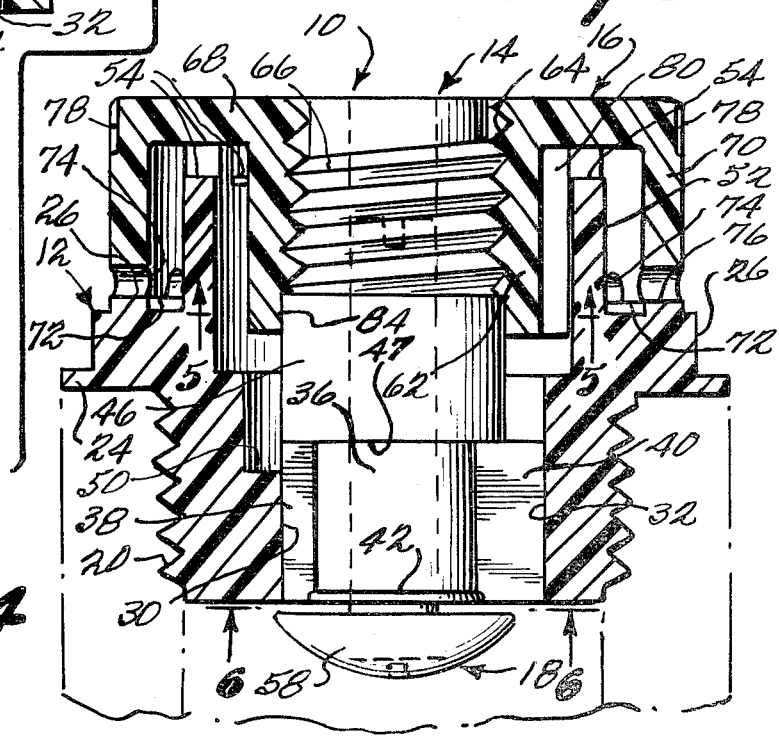
FIG. 4 is a vertical sectional view of the sprinkler head illustrating the spray adjusting member in the limiting position thereof in which the spray is defined as a plurality of discrete streams.

As best shown in FIGS. 3, 4 and 6, the interior of the lower portion of the sprinkler body 12 includes interior surfaces adapted to cooperatively engage with exterior surfaces on the lower end portion of the tubular member 14 to affect a fixed securement of the tubular member within the annular body 12. As shown, the surfaces include a cylindrical surface 28 having a pair of axially extending keyways 30 and 32 formed therein in diametrically opposed relation. As shown, the keyway 32 has a radial extent greater than the radial extent of the keyway 30. Formed in the lower extremity of the cylindrical surface 28 is an annular groove 34.

As best shown in FIGS. 3, 4 and 6, the exterior surfaces on the lower end portion of the tubular member 14 include a cylindrical surface 36 having a pair of axial key portions 38 and 40 extending radially outwardly therefrom. Here again, key portion 40 has a radial extent greater than key portion 38 so that the interengagement thereof with keyways 30 and 32, respectively, of the tubular member 14 has only one fixed operative position. Also, as before, the lower extremity of cylindrical surface 36 has an annular bead 42 extending outwardly therefrom which is adapted to engage groove 34.

Referring now more particularly to FIGS. 3 and 6, the cylindrical surface 28 also has a plurality of annularly spaced axially extending slots 44 communicating therewith. As best shown in FIG. 6, there are four such slots equally spaced about the cylindrical surface 28. These slots 44 constitute inlet passages for the flow of water from the supply pipe 22.

As best shown in FIG. 4, when the tubular member 14 is disposed in its fixed operative position, exterior cylindrical surface areas 36 are disposed in engagement with interior cylindrical surface areas 28, key portions 38 and 40 are disposed within keyways 30 and 32, respectively, and bead sections 42 are disposed within groove sections 34.

The central exterior peripheral portion of the tubular member 14 is cylindrical, as indicated at 46, and has a radius equal to the radius of the key portion 38. The central portion of the tubular member thus provides a pair of downwardly facing arcuate shoulders 47 which engage the upper surfaces 48 provided by the adjacent portions of the sprinkler body 12. As shown, the central interior portion of the sprinkler body 12 has a bore 50 which extends downwardly to a position below the surfaces 48. With this arrangement, the upper ends of the inlet passage slots communicate with bore 50 at their upper ends.

Formed in the sprinkler body 12 in a position outwardly of the central bore 50 and extending upwardly therefrom is an annular wall 52, the interior surface of which serves to direct the flow of water upwardly therealong. The upper end portion of the annular wall 52 is preferably provided with a series of annularly spaced radially extending slots 54.

As previously indicated, the interior of the tubular member 14 includes a threaded section 56 adapted to threadedly engage the exterior threaded shank of the metal screw 18. The metal screw 18 is preferably of conventional configuration and includes a round head 58 on one end of the shank. The opposite end of the shank has a slot 60 extending diametrically thereacross. The screw 18 is threadedly engaged within the tubular member 14 so that the head thereof is disposed below the lower end of the slots 44.

It will be understood that by turning the adjusting screw 18, as by a screwdriver engaged within slot 60, head 58 will be moved axially toward and away from the lower end of the slots 44. In this way, the head is disposed in various positions of flow restriction with respect to the inlet passages defined by slots 44 so as to determine the amount of flow passing therethrough.

The spray adjusting mechanism 16 includes an inner annular portion 62 formed with a section of threads 64 on the upper interior periphery thereof. The upper exterior surface of the tubular member 14 is provided with a section of mating threads 66. In this way, the screw adjusting mechanism 16 is mounted on the tubular member 14 for axial movement with respect thereto, which axial movement is accomplished by turning the adjusting member with respect to the tubular member 14.

The screw adjusting member 16 includes an end wall 68 extending radially outwardly from the upper end of the inner annular portion 62 which serves to direct the flow of water passing upwardly along the annular wall 52 in a direction outwardly therefrom. Extending downwardly from the periphery of the end wall 68 is a cylindrical peripheral wall 70. As best shown in FIG. 4, the interior of the peripheral wall 70 is disposed in spaced relation to the exterior of annular wall 52 so as to provide an annular space through which the water passing outwardly along the end wall 68 is directed downwardly.

The lower edge of cylindrical peripheral wall 70 is formed with downwardly facing spray defining surfaces. These surfaces include an annularly planar radial surface 72 having a series of annularly spaced radially extending semi-cylindrical recesses 74 formed therein. The central portion of the sprinkler body 12 includes an annular ridge having an upwardly facing planar radially extending surface 76 which also serves as a spray defining surface.

Figure 2:
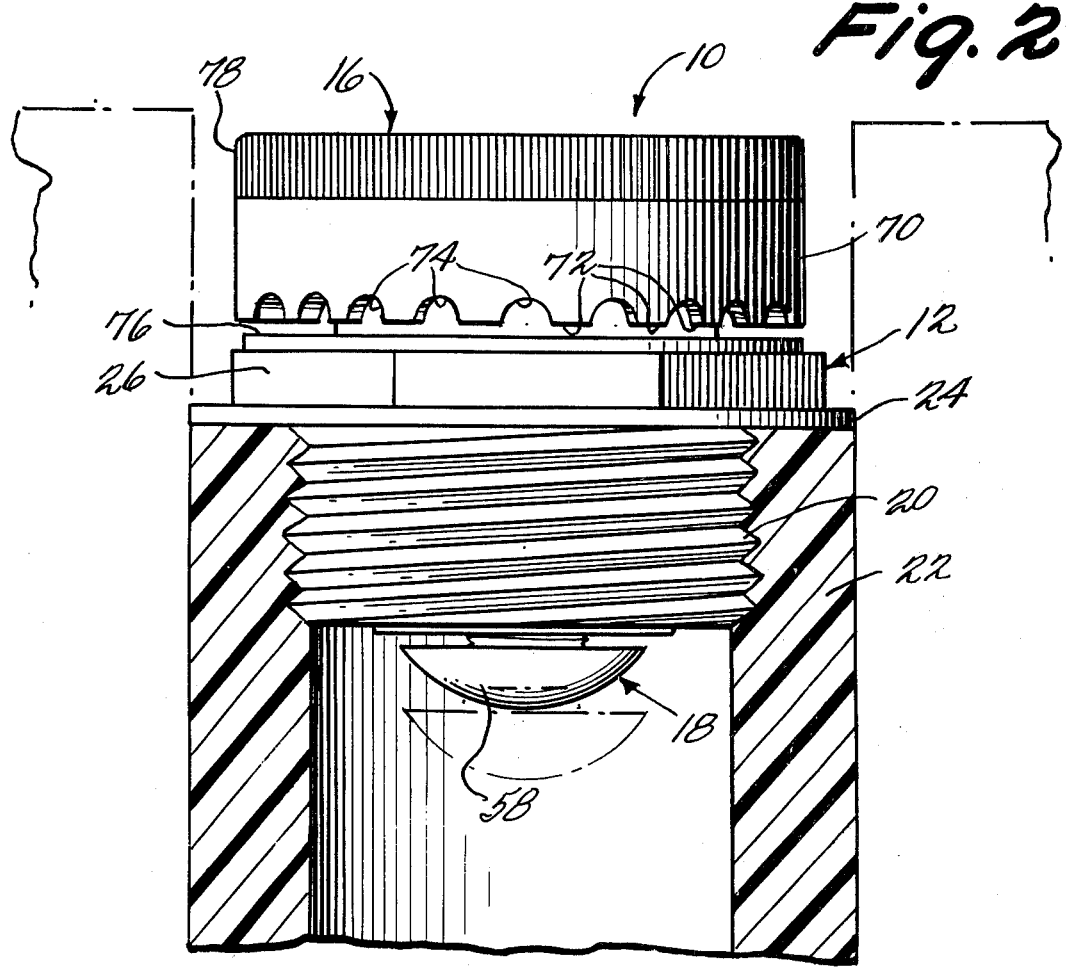
FIG. 2 is a front elevational view of the sprinkler head shown in FIG. 1, illustrating the spray adjusting member in an open position of adjustment wherein the spray is defined as an umbrella sheet pattern.

As best shown in FIG. 2, the upper exterior periphery of the spray adjusting mechanism 16 is formed with a serrated surface which enables an operator to readily turn the spray adjusting mechanism with respect to the tubular member and sprinkler body. When the spray adjusting mechanism is turned in the tightening or clockwise direction when viewed from above, it will move into a limiting position as shown in FIG. 4 wherein surfaces 72 and 76 are in engagement. It will also be noted that the upper edge of annular wall 52 engages the lower surface of end wall 68. In this position, the semi-cylindrical recesses 74 and the co-extensive portions of the annular surface 76 provide outlet openings through which the water flowing through the sprinkler head issues as a series of annularly spaced radially outwardly extending discrete streams.

In the embodiment shown, there are 24 semi-cylindrical recesses 74 formed in equally spaced relation within the surface 72. It will be understood that the number and position of the recesses can be varied so that when the spray adjusting member is in the stream defining limiting position shown in FIG. 4, the stream pattern will be of a half-circle configuration, a quarter-circle configuration, a diamond configuration or any other desired known configuration.

Figure 5:
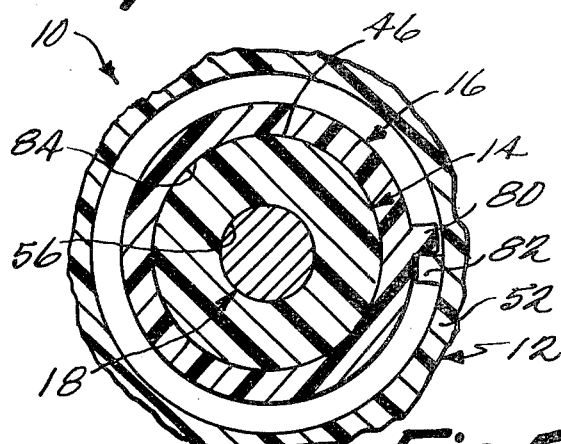
FIG. 5 is a fragmentary sectional view taken along line 5—5 of FIG. 4.

With reference to FIG. 5, it will be noted that the spray adjusting member 16 has formed therein an axial stop rib 80 which extends radially outwardly from the inner annular portion 62. A cooperating axial stop rib 82 is formed on the interior surface of the annular wall 52. These stop ribs are disposed in co-extensive relation so as to interengage when the sprinkler head 10 is properly assembled and the spray adjusting member is rotated.

With reference to FIGS. 3 and 4, the sprinkler head 10 of the present invention is assembled by first threadedly engaging the spray adjusting member 16 onto the upper end of the tubular member 14. In this regard, it will be noted that the interior section of threads 64 terminates above the lower end of the inner annular portion 62 so that there is provided a lower skirt having a cylindrical surface 84 which engages the cylindrical surface 46. This engagement provides a seal for the interengaging threads 64 and 66 which prevents the flow of liquid therebetween. The sealing engagement also provides sufficient frictional contact to retain the spray adjusting member 16 in any position of adjustment while at the same time permitting a yielding movement out of such position of adjustment.

With the spray adjusting member 16 threadedly engaged on the tubular member 14, the two members are moved downwardly through the central interior of the sprinkler body 12. Key portions 38 and 40 are aligned with keyways 30 and 32, respectively, and then the two members 14 and 16 are pushed axially into body 12 until bead sections 42 snap into the corresponding groove sections 34. It will be noted that during this movement, stop ribs 80 and 82 are moved into coextensive relation with respect to one another. The interengagement of cylindrical surfaces 36 and 28, key portions 38 and 40 with keyways 30 and 32, the bead sections 42 within groove sections 34 and shoulder 47 with the end surfaces 48 serve to fixedly secure the tubular member 14 within the sprinkler body 12 and prevent relative movement therebetween in any direction.

The arrangement also permits spray adjusting member 16 to be turned in a counter-clockwise direction, as viewed from above, by means of serrations 78 through an angular extent of slightly less than 360° from the limiting position shown in FIG. 4 until stop rib 80 again engages stop rib 82. The axial component of movement of the spray adjusting member 16 serves to space the downwardly facing spray defining planar surfaces 72 above the upwardly facing spray defining planar surface 76 as shown in FIG. 2. This spacing changes the spray pattern from discrete streams as in the limiting position shown in FIG. 4 into an umbrella sheet spray pattern, the thickness and diameter of which is determined by spacing for any specific setting of the flow control screw 18. The assembly of the sprinkler head 10 is completed by threadedly engaging the screw 18 upwardly into the interior threaded opening 56 after the tubular member 14 has been moved into its fixed operative position as aforesaid. The threaded engagement of the screw 18 can be initially accomplished by means of a conventional Phillips-type recess formed in the head. After the sprinkler head 10 is mounted on the supply pipe 22, the screw head 58 will be disposed in communication with the water under pressure communicating with the supply pipe and therefore inaccessible. Adjustment of the axial position of the screw head to determine the flow rate through inlet passages 44 is accomplished by moving a screwdriver downwardly through the open end of the tubular member 14 and into the slot 60.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

I claim:
1. A sprinkler head comprising:
   an annular body having means on a lower portion thereof for fixedly securing the same to a supply member having a source of water under pressure communicated therewith;
   said body having a tubular member therein defining an interiorly threaded opening extending axially in relation to said annular body;
   an adjusting screw threadably mounted in said interiorly threaded opening, said screw having an enlarged head on the lower end thereof disposed in communicating relation to the water under pressure communicated with said body;
   means within said body defining inlet passage means disposed in flow restricted relation with respect to said adjusting screw head whereby the axial position of said adjusting screw head determines the amount of flow of water through said inlet passage means;

said body having an annular wall disposed outwardly of said inlet passage means and extending upwardly therefrom for directing the flow of water passing through said inlet passage means upwardly along the interior thereof;

a spray adjusting member mounted on the upper end portion of said tubular member for axial adjustment with respect thereto;

said spray adjusting member having an upper end wall extending radially outwardly in a position above said annular wall so as to receive the water flowing upwardly therealong and direct the same outwardly;

said spray adjusting member having a peripheral wall extending downwardly from the periphery of said upper end wall in spaced relation to said annular wall so as to cause the flow of water directed outwardly by said upper end wall to pass downwardly between the interior of said peripheral wall and the exterior of said annular wall; and cooperating downwardly facing surface means on the lower portion of said peripheral wall and upwardly facing surface means on said body for confining the water flowing downwardly between said peripheral wall and said annular wall into an outwardly directed spray pattern which can be varied depending upon the axial position of adjustment of said spray adjusting member with respect to said body.

2. A sprinkler head as defined in claim 1 wherein said spray adjusting member has a central opening extending axially therethrough, the upper end of said adjusting screw having an upwardly facing slot formed therein for receiving a turning tool movable downwardly through said central opening in said spray adjusting member.

3. A sprinkler head as defined in claim 1 wherein said spray adjusting member includes an inner annular portion, said inner annular portion having interior threads engaging exterior threads formed on the upper end of said tubular member whereby rotational movement of said spray adjusting member with respect to said tubular member will affect said axial adjustment.

4. A sprinkler head as defined in claim 3 wherein said tubular member is molded of plastic material separate from said body, said tubular member having a lower exterior surface means cooperating with an interior surface means in said body for enabling said tubular member to be moved axially with respect to said body and snapped into a fixed operative position wherein said exterior and interior surface means are in engagement and effectively prevent relative movement between said tubular member and said body.

5. A sprinkler head as defined in claim 4 wherein said exterior surface means includes a cylindrical surface having a radially outwardly extending bead on the lower extremity thereof and a pair of key portions extending radially outwardly therefrom in diametrically opposed relation, one of said key portions having a radial extent greater than the radial extent of the other of said key portions.

6. A sprinkler head as claimed in claim 5 wherein said interior surface means includes a cylindrical surface having a pair of keyways formed therein of a size to receive said pair of key portions and a bead receiving groove formed in the extremity thereof, said cylindrical surface having a plurality of annularly spaced axially extending slots communicating therewith, said axially extending slots defining said inlet passage means.

7. A sprinkler head as defined in claim 3 wherein said annular wall has an axially extending stop rib formed on the interior surface thereof, the inner portion of said adjusting member having a cooperating axially extending stop rib on the exterior thereof for limiting the rotational movement of said spray adjusting member with respect to said body to an arcuate extent less than 360°.

8. A sprinkler head as defined in claim 1 wherein the upper end of said annular wall is formed with a plurality of annularly spaced radially extending slots.

9. A sprinkler head as defined in claim 1 wherein said downwardly facing surface means on said peripheral wall includes a downwardly facing radially extending annular surface having formed therein a multiplicity of annularly spaced radially extending semi-cylindrical recesses.

10. A sprinkler head as defined in claim 9 wherein said upwardly facing surface means comprises an upwardly facing radially extending annular surface operable when said spray adjusting member is in one limiting position of adjustment to engage said downwardly facing annular surface whereby said semi-cylindrical recesses define the spray pattern as discrete streams.

11. A sprinkler head as defined in claim 1 wherein said fixedly securing means on the lower portion of said annular body comprises exterior threads.

12. A sprinkler head as defined in claim 11 wherein said body includes a plurality of exterior wrench receiving lands on the central exterior periphery thereof.

13. A sprinkler head as defined in claim 1 wherein said spray adjusting member includes an inner annular portion extending downwardly from said end wall in inwardly spaced relation to said peripheral wall, said tubular member including a central exterior cylindrical surface, said inner annular portion having a lower interior annular sealing surface sealingly engaging said central exterior cylindrical surface.

14. A sprinkler head as defined in claim 13 wherein said spray adjusting member is mounted on said tubular member for axial movement by a section of threads on the interior of said inner annular portion above said annular sealing surface and a cooperating section of threads on the exterior of said tubular member above said central cylindrical surface.

* * * * *